US008139693B2

(12) United States Patent
Wang et al.

(10) Patent No.: US 8,139,693 B2
(45) Date of Patent: Mar. 20, 2012

(54) APPARATUS AND METHOD FOR ESTIMATING INTER-CARRIER INTERFERENCE POWER AND NOISE POWER IN A CHANNEL

(75) Inventors: Lai-Huei Wang, Taoyuan County (TW); Pang-An Ting, Taichung County (TW); Chien-Yu Kao, Taipei County (TW); Chia-Hung Lin, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 404 days.

(21) Appl. No.: 12/487,691

(22) Filed: Jun. 19, 2009

(65) Prior Publication Data

US 2010/0104053 A1  Apr. 29, 2010

(30) Foreign Application Priority Data

Oct. 28, 2008  (TW) ................................. 97141447 A (51) Int. Cl.
*H03D 1/04* (2006.01)
(52) U.S. Cl. ........ 375/346; 375/260; 375/262; 375/347; 375/349; 375/341; 455/61; 455/67.13; 455/303; 455/135

(58) Field of Classification Search .................. 375/260, 375/346, 262, 347, 349, 341; 455/61, 67.13, 455/303, 135
See application file for complete search history.

(56) References Cited

U.S. PATENT DOCUMENTS

| 7,120,440 B2 * | 10/2006 | Cho et al. ........................ 455/441 |
| 2006/0239364 A1 * | 10/2006 | Wilhelmsson ................ 375/260 |
| 2007/0183485 A1 * | 8/2007 | Leimer ........................ 375/148 |

* cited by examiner

*Primary Examiner* — Khanh C Tran
*Assistant Examiner* — Rahel Guarino
(74) *Attorney, Agent, or Firm* — Thomas|Kayden (57) ABSTRACT

An estimation method is provided for use in a receiver of an OFDM (orthogonal frequency division multiplexing) system to estimate the ICI (inter-carrier interference) and the noise power of a channel. Two pilot signals respectively carried by two subcarriers are received from the channel wherein the two pilot signals are adjacent and differ by a first phase angle. Another two pilot signals respectively carried by another two subcarrier are received from the channel wherein the another two pilot signals are adjacent and differ by a second phase angle. According to some embodiments of the invention, these phases are correlated with the ICI power, but are uncorrelated with the noise power. The estimation method then individually estimates the ICI power and noise power according to the first phase and the second phase.

14 Claims, 5 Drawing Sheets

APPARATUS AND METHOD FOR ESTIMATING INTER-CARRIER INTERFERENCE POWER AND NOISE POWER IN A CHANNEL

This application claims the benefit of Taiwan application Serial No. 97141447, filed Oct. 28, 2008, the subject matter of which is incorporated herein by reference.

BACKGROUND

1. Technical Field

The invention relates in general to an estimation method and an estimation device, and more particularly to an estimation method for use in an orthogonal frequency division multiplexing (OFDM) system to estimate the inter-carrier interference (ICI) power and the noise power in a channel and an estimation device therefor.

2. Description of the Related Art

In the field of communication, the signal is transmitted from a transmitter to a receiver through a channel. In an orthogonal frequency division multiplexing (OFDM) system, for example, the signals are transmitted by the transmitter of the OFDM system through the channel. In the course of transmitting signals, the signals being transmitted are usually influenced by the inter-carrier interference (ICI) power and the noise power in the channel.

Besides, in a mobile communication system, the velocity of the relative movement between the transmitter and the receiver may introduce Doppler spread in the channel used for signal transmission. At this time, if the system in implemented with the OFDM system, the Doppler spread effect will affect the ICI power, wherein the relative velocity is proportional to the ICI power. In such an OFDM system, when the ICI power dominates (i.e. the ICI power is higher than the noise power) and influences the OFDM system seriously, the system may need to adopt the ICI mitigation mechanism to mitigate the influence of the ICI noise.

However, when the noise power dominates (i.e. the noise power is higher than the ICI power), the influence of the ICI power on the OFDM system becomes relatively smaller. In this case, the performance of the OFDM system could be reduced if the OFDM system also adopts the ICI mitigation mechanism. Hence, the performance of OFDM system can be enhanced by selectively adopting the ICI mitigation mechanism if the ICI power and the noise power in the ICI channel can be estimated. Therefore, how to individually estimate the ICI power and the noise power is still a subject of the industrial endeavor.

SUMMARY

The invention is directed to an estimation method and an estimation device, wherein two pairs of pilot signals each having a difference in their phase angles are transmitted on two pairs of adjacent subcarriers, and the channel response corresponding to each subcarrier is obtained by smoothing the estimation values. In this way, it is found that the phase angles are correlated with the ICI power and uncorrelated with the noise power, and the ICI power and the noise power can thus be individually estimated. Therefore, the receiver is capable of determining how to deal with the ICI according to the ICI power and the noise power being estimated, and is capable of facilitating appropriate allocation of the system resources properly and enhancing the system performance in operation.

According to a first aspect of the present invention, an estimated method being applied to a receiver in an orthogonal frequency division multiplexing (OFDM) system is provided for estimating the inter-carrier interference (ICI) power and the noise power in a channel. The method includes the following steps. First, receive a first pilot signal and a second pilot signal carried on a first subcarrier and a second subcarrier, respectively, through the channel. The first subcarrier and the second subcarrier are adjacent and differ with a first phase angle. Then, obtain a first channel estimation value and a second channel estimation value according to the first pilot signal and the second pilot signal. Next, determine a first channel response by performing a smooth process on the first channel estimation value and the second channel estimation value. Following that, obtain a first expected value according to the difference between the first channel expected value and the first channel response. Afterwards, receive a third pilot signal and a fourth pilot signal carried on a third subcarrier and a fourth subcarrier, respectively, through the channel. The third subcarrier and the fourth subcarrier are adjacent and differ with a second phase angle. Then, obtaining a third channel estimation value and a fourth channel estimation value according to the third pilot signal and the fourth pilot signal. Next, determine a second channel response by performing the smooth process on the third channel estimation value and the fourth channel estimation value. Following that, obtain a second expected value according to the difference between the third channel expected value and the second channel response. Finally, individually estimate the ICI power and the noise power according to the first phase angle, the second phase angle, the first expected value, and the second expected value.

According to a second aspect of the present invention, an estimation device applied in an orthogonal frequency division multiplexing (OFDM) system is provided for estimating the inter-carrier interference (ICI) power and the noise power in a channel. The estimation device includes a demodulation unit, a channel estimation unit, a smooth process unit, a calculation unit, and a power estimation unit. The demodulation unit is for receiving a first pilot signal and a second pilot signal carried on a first subcarrier and a second subcarrier, respectively, through the channel. The demodulation unit is further for receiving a third pilot signal and a fourth pilot signal carried on a third subcarrier and a fourth subcarrier, respectively, through the channel. The first subcarrier and the second subcarrier are adjacent and differ with a first phase angle while the third subcarrier and the fourth subcarrier are adjacent and differ with a second phase angle. The channel estimation unit is for obtaining a first channel estimation value and a second channel estimation value according to the first pilot signal and the second pilot signal, respectively. The channel estimation unit is further for obtaining a third channel estimation value and a fourth channel estimation value according to the third pilot signal and the fourth pilot signal, respectively. The smooth process unit is for determining a first channel response by smoothing the first channel estimation value and the second channel estimation value, and is further for determining a second channel response by smoothing the third channel estimation value and the fourth channel estimation value. The calculation unit is for obtaining a first expected value according to the difference between the first channel expected value and the first channel response, and is further for obtaining a second expected value according to the difference between the third channel expected value and the second channel response. The power estimation unit is for individually estimating the ICI power and the noise power according to the first phase angle, the second phase angle, the first expected value, and the second expected value.

The invention will become apparent from the following detailed description of the preferred but non-limiting embodiments. The following description is made with reference to the accompanying drawings.

DETAILED DESCRIPTION

Figure 1:
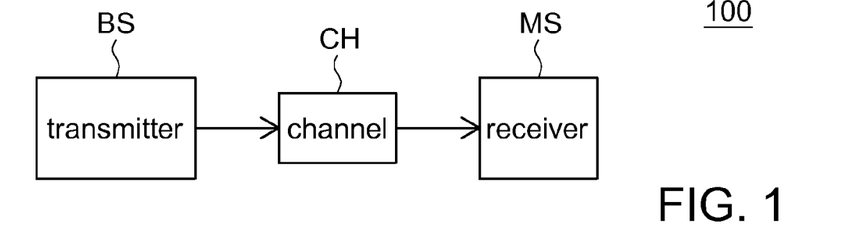
FIG. 1 is a block diagram showing an orthogonal frequency division multiplexing (OFDM) system.

FIG. 1 is a block diagram of an orthogonal frequency division multiplexing (OFDM) system. The OFDM system 100 includes a transmitter BS and a receiver MS. The receiver MS receives the signal transmitted from the transmitter BS through a channel CH, which indicates the signal transmission path between the transmitter BS and the receiver MS.

In the course of estimation, the transmitter BS transmits the pilot signals carried on the subcarriers, wherein the pilot signals are regarded as known signals to both of the transmitter BS and the receiver MS. When receiving the pilot signals, the receiver MS is able to estimate the power of the interference signal according to the received pilot signals. Therefore, the estimation method and estimation system disclosed in the embodiment of this invention can be applied to the receiver MS in the above OFDM system 100 for estimating the inter-carrier interference (ICI) power and noise power. Preferably, this embodiment can individually estimate the ICI power and the noise power in the channel CH.

Figure 2:
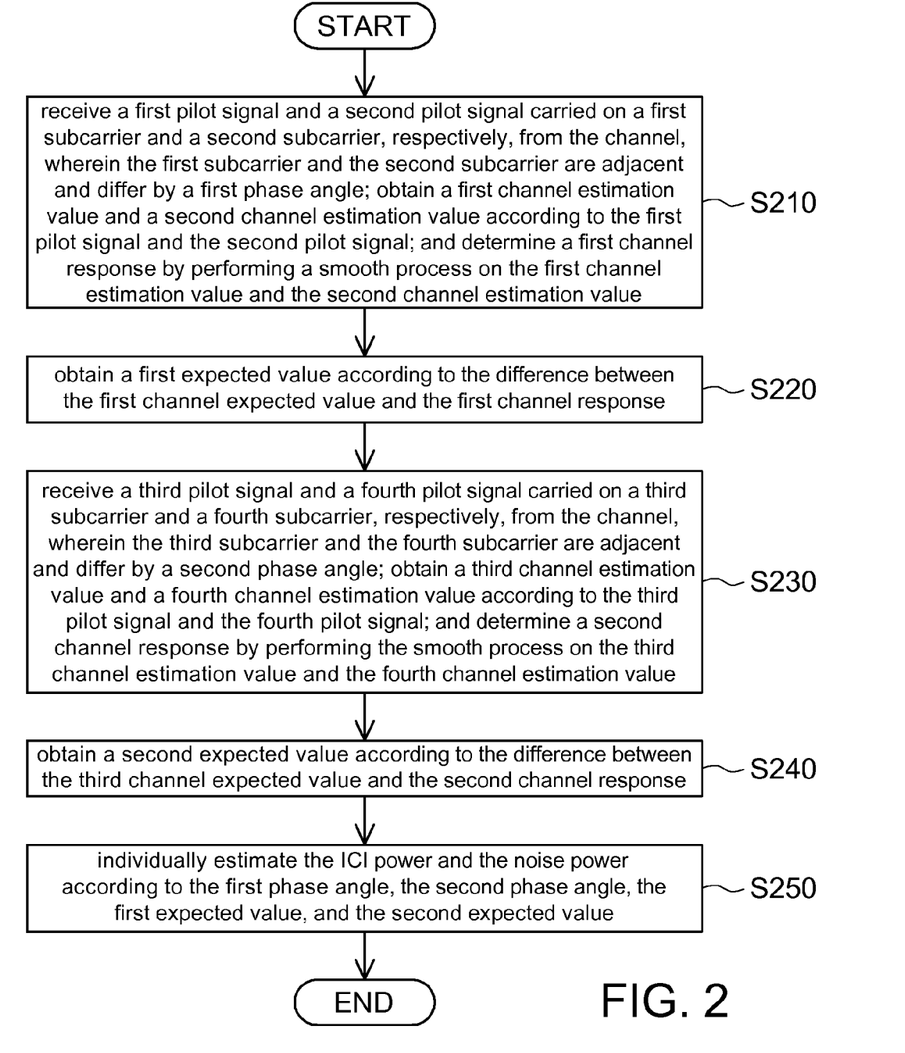
FIG. 2 is a flow chart showing an estimation method according to an embodiment of the invention.
Figure 3:
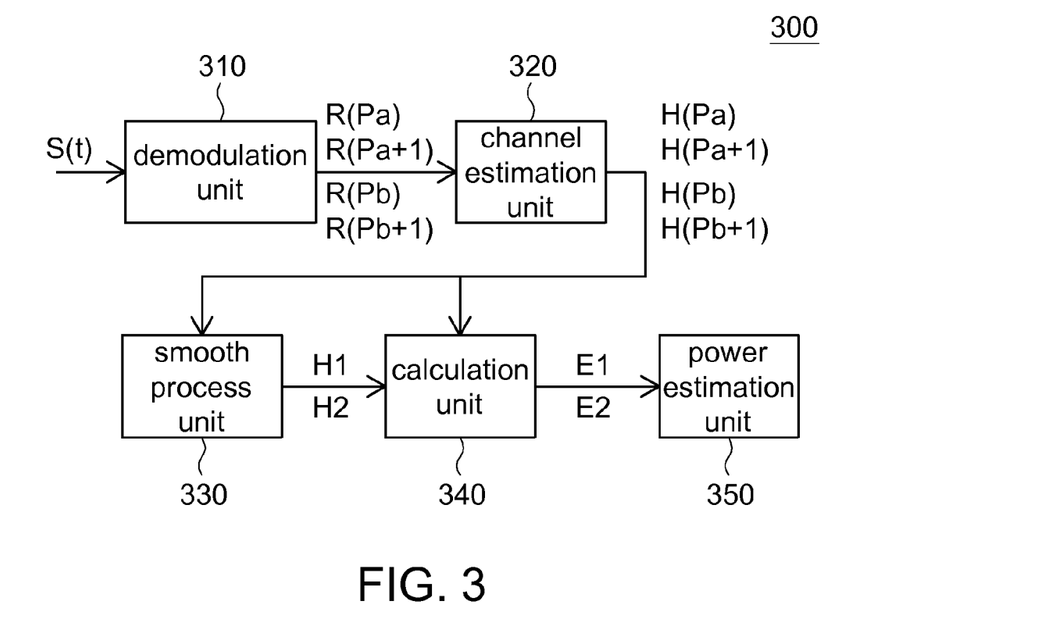
FIG. 3 is a block diagram showing an estimation device according to an embodiment of the invention.
Figure 4:
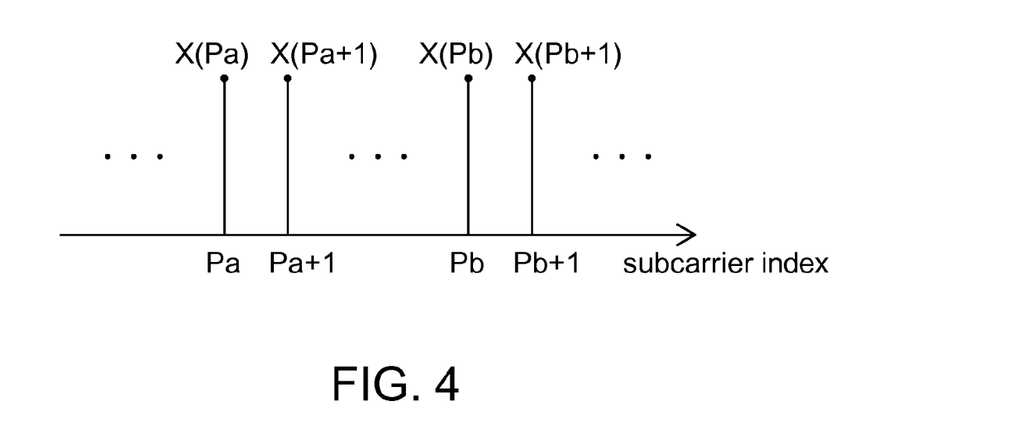
FIG. 4 is a schematic diagram showing an example of a number of subcarriers corresponding to different subcarrier indexes, on which a number of pilot signals being transmitted by the transmitter of FIG. 1 are carried.

Refer to FIGS. 2 to 4 at the same time for illustration. FIG. 2 is a flow chart showing an estimation method according to an embodiment of the invention. FIG. 3 is a block diagram showing an estimation device 300 according to an embodiment of the invention. FIG. 4 is a schematic diagram showing an example of a number of subcarriers corresponding to different subcarrier indexes, on which a number of pilot signals being transmitted by the transmitter BS in FIG. 1 are carried. In FIG. 3, the estimation device 300 executes the estimation method as shown in FIG. 2 to receive the pilot signals carried on the subcarriers and transmitted by the transmitter BS, and thus to individually estimate the ICI power and the noise power according to the received signals.

The estimation device 300 includes a demodulation unit 310, a channel estimation unit 320, a smooth process unit 330, a calculation unit 340, and a power estimation unit 350. In an example, the estimation device 300 is used to execute a number of steps S210 to S250 of the estimation method. The function and operation of each unit of the estimation device 300 will be elaborated below.

As shown in FIG. 4, the demodulation unit 310 receives a pilot signal X(Pa) and a pilot signal X(Pa+1) carried on a subcarrier Pa and a subcarrier Pa+1, respectively, from the channel CH. The demodulation unit 310 further receives a pilot signal X(Pb) and a pilot signal X(Pb+1) carried on a subcarrier Pb and a subcarrier Pb+1, respectively, from the channel CH. The pilot signals X(Pa), X(Pa+1), X(Pb+1), and X(Pb+1) may be, for example, carried on the subcarriers Pa, Pa+1, Pb, and Pb+1, respectively, and transmitted to the receiver MS through the channel CH by the transmitter BS in FIG. 1.

The subcarrier Pa is adjacent to the subcarrier Pa+1 while the subcarrier Pb is adjacent to the subcarrier Pb+1. When two subcarriers are adjacent to each other, it means that the subcarrier indexes, or the frequencies, of the two subcarriers are relatively close to each other. Preferably, the difference between the subcarrier indexes of the subcarriers Pa and Pa+1 equals substantially to 1, while the difference between the subcarrier indexes of the subcarriers Pb and Pb+1 equals substantially to 1. For example, in the Wimax 802.16e communication standard, two subcarriers having their subcarrier indexes, such as subcarrier Pa and Pa+1, differ by 1 and their frequency difference is about 10.94 kHz.

Moreover, the pilot signals X(Pa) and X(Pa+1) carried on the adjacent subcarriers Pa and Pa+1 differ by a first phase angle, while the pilot signals X(Pb) and X(Pb+1) carried on the adjacent subcarriers Pb and Pb+1 differ by a second phase angle. The phase angles are correlated with the ICI power but are uncorrelated with the noise power. The following passages will describe how the phase angles are correlated with the ICI power.

As shown in FIG. 3, in practical embodiments, the pilot signals X(Pa), X(Pa+1), X(Pb+1), and X(Pb+1) are modulated, for example, by the transmitter BS using an inverse fast Fourier transform (IFFT), and then the modulated ones in the form of a time domain signal S(t) will be transmitted to the receiver MS. Accordingly, the demodulation unit 310 may, for example, adopt FFT to convert the time domain signal S(t) into frequency domain signals, such as the received signals R(Pa), R(Pa+1), R(Pb), and R(Pb+1), for use in the channel estimation unit 320.

The channel estimation unit 320 obtains channel estimation values H(Pa) and H(Pa+1) according to the pilot signals X(Pa) and X(Pa+1), respectively. The channel estimation unit 320 further obtains channel estimation values H(Pb) and H(Pb+1) according to the pilot signals X(Pb) and X(Pb+1), respectively. The smooth process unit 330 smoothes the channel estimation values H(Pa) and H(Pa+1), so as to determine a first channel response H1. The smooth process unit 330 further smoothes the channel estimation values H(Pb) and H(Pb+1), so as to determine a second channel response H2.

The calculation unit 340 obtains a first expected value E1 according to the difference between the channel estimation value H(Pa) and the channel response H1. The calculation unit 340 further obtains a second expected value E2 according to the difference between the channel estimation value H(Pb) and the second channel response H2. In this regard, the calculation unit 340 may first, for example, obtain a number of differences in a predetermined time period, or obtain a predetermined number of differences, wherein each difference represents a difference between the channel estimation value H(Pa) and the first channel response H1. The calculation unit 340 then determines the first expected value E1 according to these differences and their corresponding probabilities. The first expected value E1 contains the ICI power and the noise power in the channel CH. Similarly, the second expected value E2 also contains the ICI power and noise power in the channel CH.

In practical embodiments, the applicant found that the first channel response H1 after smoothing is correlated with both of the channel estimation values H(Pa) and H(Pa+1), so that the difference obtained from the channel estimation value H(Pa) and the first channel response H1 is correlated with the two adjacent channel estimation values H(Pa) and H(Pa+1). Further, the ICI power contained in the first expected value E1 is also correlated with the first phase angle because the first expected value E1 is obtained according to the differences indicating the relationship between the ICI power and the first phase angle (by which the two adjacent pilot signals X(Pa) and X(Pa+1) differs) with respect to the first expected value E1. Analogically, the ICI power contained in the second expected value E1 is correlated with the second phase angle.

Moreover, the above-mentioned calculation unit 340 may obtain the expected value of the difference between the channel estimation value H(Pa+1) and the first channel response H1 and regard it as the first expected value E1, and obtain the expected value of the difference between the channel estimation value H(Pb+1) and the second channel response H2 and regard it as the second expected value E2. As a result, the ICI power contained in the first and the second expected values E1 and E2 will be correlated with the first phase angle and the second phase angle, respectively.

This shows that the first expected value E1 contains the ICI power and noise power in the channel CH while the second expected value E2 also contains the ICI power and noise power in the channel CH, wherein the ICI power is correlated with both of the first phase angle and the second phase angle. Thus, the power estimation unit 350 is enabled to individually estimate the ICI power and the noise power according to the first phase angle, the second phase angle, the first expected value E1, and the second expected value E2.

Figure 5:
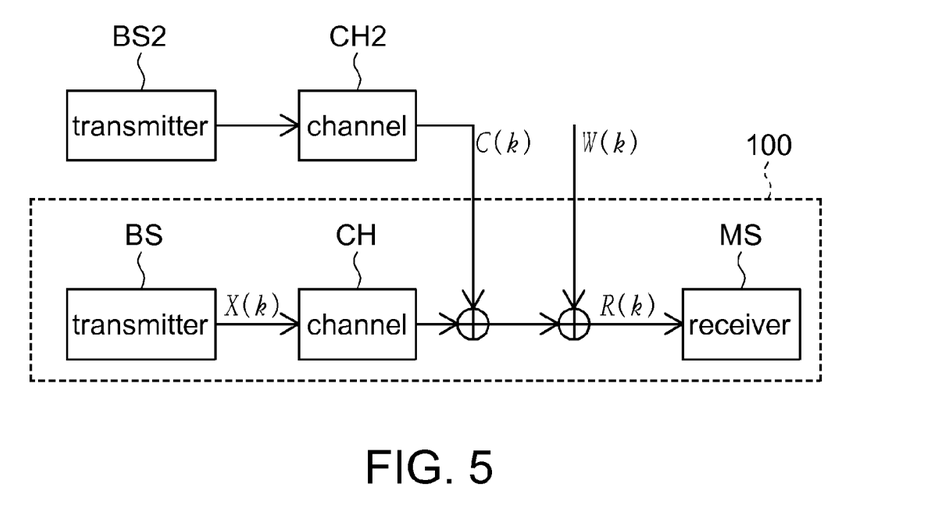
FIG. 5 is a block diagram showing an equivalent system model of the OFDM system in FIG. 1 when operating.

A practical example will be made to detail how the phase angles are correlated with the ICI power and uncorrelated with the noise power. FIG. 5 is a block diagram showing an equivalent system model 500 of the OFDM system 100 in FIG. 1 when operating. In the equivalent system model 500, the transmitter BS transmits a signal X(k) being carried on the $k^{th}$ subcarrier, and transmits the signal X(k) to the receiver MS through the channel CH. The k indicates a certain subcarrier index. In the course of transmitting signal X(k), it is assumed that there is a relative velocity between the transmitter BS and the receiver MS, which will affect the amplitude of the ICI signal (not shown in FIG. 5).

The equivalent system model 500 further receives an additive white Gaussian noise (AWGN) signal W(k), and a co-channel interference (CCI) signal C(k) from another transmitter BS2. The cause of the CCI is that the signal transmitted from the transmitter BS2 to another receiver (not shown) through another channel CH2 will influence the receiver MS when the transmitters BS and BS2 transmits the pilot signals X(k) being carried on a same portion of the subcarriers. Thus, the equivalent system model 500 in this example regards the sum of the power of AWGN signal W(k) and CCI signal C(k) as the noise power.

The equations for obtaining the ICI power and the noise power are derived as follows. Regarding to the $k^{th}$ subcarrier, the received signal R(k) carried on the $k^{th}$ subcarrier may be represented as below:

$$R(k)=X(k)H_{avg}(k)+I(k)+W(k)+C(k)$$

wherein R(k) denotes the received signal on the $k^{th}$ subcarrier received by the receiver MS; X(k) denotes the signal on the $k^{th}$ subcarrier transmitted by the transmitter BS; $H_{avag}(k)$ denotes the average response of the $k^{th}$ subcarrier in the channel CH1; I(k) denotes the ICI signal corresponding to the $k^{th}$ subcarrier; W(k) denotes the AWGN signal corresponding to the $k^{th}$ subcarrier; and the C(k) denotes the CCI signal corresponding to the $k^{th}$ subcarrier.

Figure 6A:
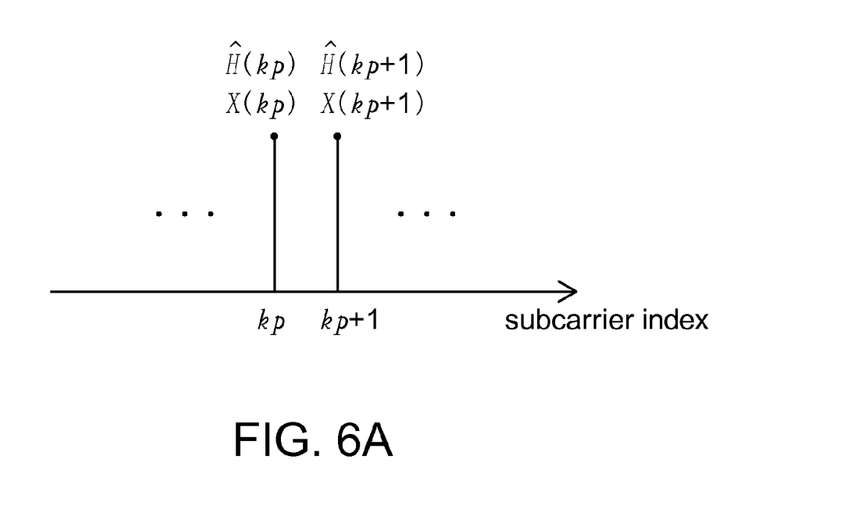
FIG. 6A is a schematic diagram showing that the pilot signals X(kp) and X(kp+1) being transmitted by the transmitter BS in FIG. 5 are carried on the adjacent subcarriers kp and kp+1, and the receiver MS estimates the channel estimation values $\hat{H}(kp)$ and $\hat{H}(kp+1)$ according to the pilot signals X(kp) and X(kp+1).

FIG. 6A is a schematic diagram showing that the pilot signals X(kp) and X(kp+1) being transmitted by the transmitter BS in FIG. 5 are carried on the adjacent subcarriers kp and kp+1, and the receiver MS estimates the channel estimation values $\hat{H}(kp)$ and $\hat{H}(kp+1)$ according to the pilot signals X(kp) and X(kp+1). In FIG. 6A, it is assumed that the $k^{th}$ subcarrier is the $kp^{th}$ subcarrier used for transmitting the $kp^{th}$ pilot signal, and that the channel estimation value $\hat{H}(kp)$ is obtained by employing a least square channel estimator as follows:

$$\hat{H}(kp)=R(kp)/X(kp)=H_{avg}(kp)+\hat{I}(kp)+\hat{W}(kp)+\hat{C}(kp)$$

wherein $\hat{H}(kp)$ denotes the channel estimation value of the $kp^{th}$ subcarrier; R(kp) denotes the received signal on the $kp^{th}$ subcarrier received by the receiver MS; X(kp) denotes the signal on the $kp^{th}$ subcarrier transmitted by the transmitter BS; $H_{avag}(kp)$ denotes the average response of the $kp^{th}$ subcarrier in the channel CH1; I(kp) denotes the ICI signal corresponding to the $kp^{th}$ subcarrier; W(kp) denotes the AWGN signal corresponding to the $kp^{th}$ subcarrier; and the C(kp) denotes the CCI signal corresponding to the $kp^{th}$ subcarrier.

Similarly, the channel estimation value $\hat{H}(kp+1)$ of the $kp+1^{th}$ signal carried on the $kp+1^{th}$ subcarrier can also be obtained, so that the following equation is derived:

$$\hat{H}(kp+1)=R(kp+1)/X(kp+1)=H_{avg}(kp+1)+\hat{I}(kp+1)+\hat{W}(kp+1)+\hat{C}(kp+1)$$

wherein the denotation for the parameters of the $kp+1^{th}$ subcarrier is similar to those of the $kp^{th}$ subcarrier and without detailing herein.

Moreover, as described in the embodiment of this invention, the pilot signals X(kp) and X(kp+1) for transmitting the pilot signals X(kp) and X(kp+1) differ by a phase angle as follows:

$$\text{phase}\{X(kp)/X(kp+1)\}=\theta$$

wherein phase$\{\cdot\}$ denotes the function for obtaining phase angle.

Figure 6B:
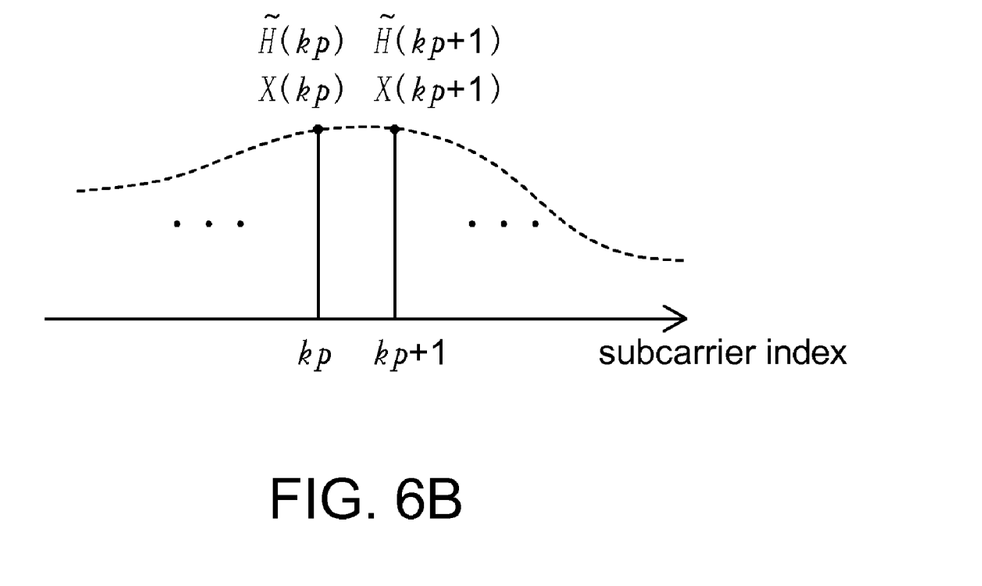
FIG. 6B is a schematic diagram showing the channel responses $\tilde{H}(kp)$ and $\tilde{H}(kp+1)$ determined by smoothing the channel estimation values $\hat{H}(kp)$ and $\hat{H}(kp+1)$ in FIG. 6A.

FIG. 6B is a schematic diagram showing the channel responses $\tilde{H}(kp)$ and $\tilde{H}(kp+1)$ determined by smoothing the channel estimation values $\hat{H}(kp)$ and $\hat{H}(kp+1)$ illustrated in FIG. 6A. In FIG. 6B, it is assumed that the smooth process performed on the channel estimation values $\hat{H}(kp)$ and $\hat{H}(kp+1)$ is an interpolation process based on discrete Fourier transform (DFT), so that the equation for the channel response $\tilde{H}(kp)$ can be simplified as follows:

$$\tilde{H}(kp) \cong H_{avg}(kp) + \frac{1}{2}\begin{bmatrix}\hat{I}(kp)+\\\hat{I}(kp+1)\end{bmatrix} + \frac{1}{2}\begin{bmatrix}\hat{W}(kp)+\\\hat{W}(kp+1)\end{bmatrix} + \frac{1}{2}\begin{bmatrix}\hat{C}(kp)+\\\hat{C}(kp+1)\end{bmatrix}$$

Then, the difference between the channel estimation value Ĥ(kp) and the channel response H̃(kp) is defined as ΔH(kp)= Ĥ(kp)−H̃(kp). Hence, another equation can be derived from the above two equations involving Ĥ(kp) and H̃(kp) as follows:

$$\Delta H(kp) = \frac{1}{2}\left[\frac{\hat{I}(kp)-}{\hat{I}(kp+1)}\right] + \frac{1}{2}\left[\frac{\hat{W}(kp)-}{\hat{W}(kp+1)}\right] + \frac{1}{2}\left[\frac{\hat{C}(kp)-}{\hat{C}(kp+1)}\right]$$

Next, it is assumed that the amplitudes of the CCI signal in different subcarriers are independent. Thus, the expected value of the ΔH(kp) can be obtained according to the following equation:

$$E[|\Delta H(k_p)|^2] \cong \tilde{P}_{ICI} + \frac{1}{2}(P_N + P_{CCI})$$

$$\tilde{P}_{ICI} = \frac{1}{4}[|I(k_p) - I(k_p+1)|^2]$$

wherein $E[|\Delta H(k_p)|^2]$ denotes the expected value of the ΔH(kp); $\tilde{P}_{ICI}$ denotes the estimation value of the ICI power; and $P_N+P_{CCI}$ denotes the noise power, i.e., the sum of the power of the AWGN signal W(kp) and the power of the CCI signal C(kp).

Through mathematic derivation and approximation, we may provide the following equation:

$$\tilde{P}_{ICI} \cong \frac{1}{2}P_{ICI}[1 - 2\beta\cos(\alpha\pi - \theta) + \beta\cos(\alpha\pi - 2\theta)]$$

wherein $P_{ICI}$ denotes the ICI power; α denotes the ratio between the channel length and the size of DFT; and β equals to $3/\pi^2$.

Figure 6C:
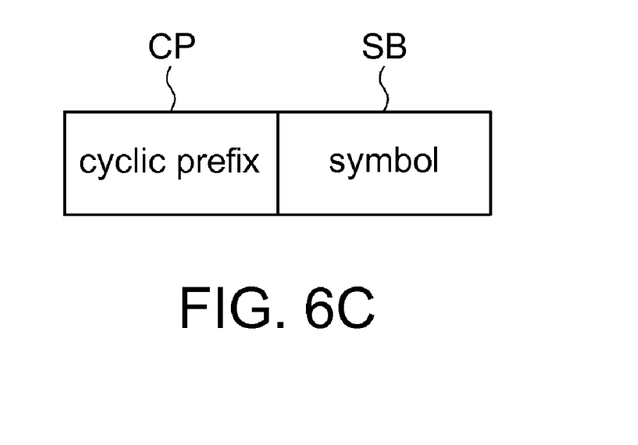
FIG. 6C is a structure diagram of the signal X(k) transmitted by the transmitter in FIG. 5.

FIG. 6C is a signal structure of the signal X(k) transmitted by the transmitter in FIG. 5. In this example, the signal structure of the signal X(k) includes a cyclic prefix CP and a symbol SB. The above-mentioned channel length is assumed to be the length of the cyclic prefix CP, and the size of the DFT is assumed to be the length of the symbol DB. In this way, the above-mentioned α denotes the ratio of the length of the cyclic prefix CP to the size of the symbol SB. However, the channel length and the size of DFT may also be adjusted or assigned with respect to different situations in practice.

The equation for the above-mentioned expected value is further derived as follows:

$$E[|\Delta H(k_p)|^2] \cong \frac{1}{2}P_{ICI}\left[\begin{array}{c}1 - 2\beta\cos(\alpha\pi - \theta) + \\ \beta\cos(\alpha\pi - 2\theta)\end{array}\right] + \frac{1}{2}(P_N + P_{CCI}) \quad (1)$$

In equation (1), the expected value contains the ICI power ($P_{ICI}$) and the noise power ($P_N+P_{CCI}$). It can be seen from the equation (1) that the ICI power is correlated with the phase angle θ while the noise power is uncorrelated with the phase angle θ. Thus, if the phase angle is changed, the change of the phase angle will affect the ICI power and cause it to change accordingly. In contrast, the change of the phase angle will not affect the noise power. Hence, if the two pilot signals carried on two subcarriers differ by a phase angle, the phase angle is correlated with the ICI power, but is uncorrelated with the noise power.

Therefore, in the embodiment of this invention, two different phase angles are utilized to obtain two relation equations similar to the equation (1). Then, the ICI power and the noise power can thus be individually estimated by solving the two relation equations.

For example, refer to FIGS. 3 and 4 mentioned above. In the example shown in FIG. 4, because the pilot signals X(Pa) and X(Pa+1) carried on the subcarriers Pa and Pa+1 differ by a first phase angle while the pilot signals X(Pb) and X(Pb+1) carried on the subcarriers Pb and Pb+1 differ by a second phase angle, we may derive from equation (1) that the first expected value E1, the first phase angle, the ICI power, and the noise power will comply with a first relation equation, and the second expected value E2, the second phase angle, the ICI power, and the noise power will comply with a second relation equation. The first and the second relation equations are illustrated as follows:

$$E[|\Delta H(k_p)|^2]_{\theta=\theta_1} = \frac{1}{2}P_{ICI}\left[\begin{array}{c}1 - 2\beta\cos(\alpha\pi - \theta_1) + \\ \beta\cos(\alpha\pi - 2\theta_1)\end{array}\right] + \frac{1}{2}(P_N + P_{CCI})$$

$$E[|\Delta H(k_p)|^2]_{\theta=\theta_2} = \frac{1}{2}P_{ICI}\left[\begin{array}{c}1 - 2\beta\cos(\alpha\pi - \theta_2) + \\ \beta\cos(\alpha\pi - 2\theta_2)\end{array}\right] + \frac{1}{2}(P_N + P_{CCI})$$

wherein $E[|\Delta H(k_p)|^2]_{\theta=\theta_1}$ denotes the first expected value E1 corresponding to the subcarrier Pa; $E[|\Delta H(k_p)|^2]_{\theta=\theta_2}$ denotes the second expected value E2 corresponding to the subcarrier Pb; $P_{ICI}$ denotes the ICI power; $P_N+P_{CCI}$ denotes the noise power; $\theta_1$ denotes the first phase angle; and $\theta_2$ denotes the second phase angle.

There are two unknown elements, i.e., the ICI power ($P_{ICI}$) and the noise power ($P_N+P_{CCI}$), in the first and the second relation equations, which enable the estimation device to find out the value of the ICI power and the noise power from solving the two relation equations.

For further illustration, assume that the first phase angle is set to be π (in radian), and the second phase angle is set to be zero (in radian). In this way, the ICI power and the noise power can be obtained by the following equations derived by solving the two relation equations:

$$P_{ICI} = \frac{E[|\Delta H(k_p)|^2]_{\theta=\pi} - E[|\Delta H(k_p)|^2]_{\theta=0}}{2\beta\cos(\alpha\pi)}, \quad (2)$$

$$P_N + P_{ICI} \approx E[|\Delta H(P_a)|^2]_{\theta=\pi} + E[|\Delta H(P_b)|^2]_{\theta=0} - P_{ICI}[1 + \beta\cos(\alpha\pi)] \quad (3)$$

wherein $E[|\Delta H(k_p)|^2]_{\theta=\pi}$ denotes the first expected value E1 where the first phase angle equals to π; $E[|\Delta H(k_p)|^2]_{\theta=0}$ denotes the second expected value E2 where the second phase angle equals to zero.

Figure 7:
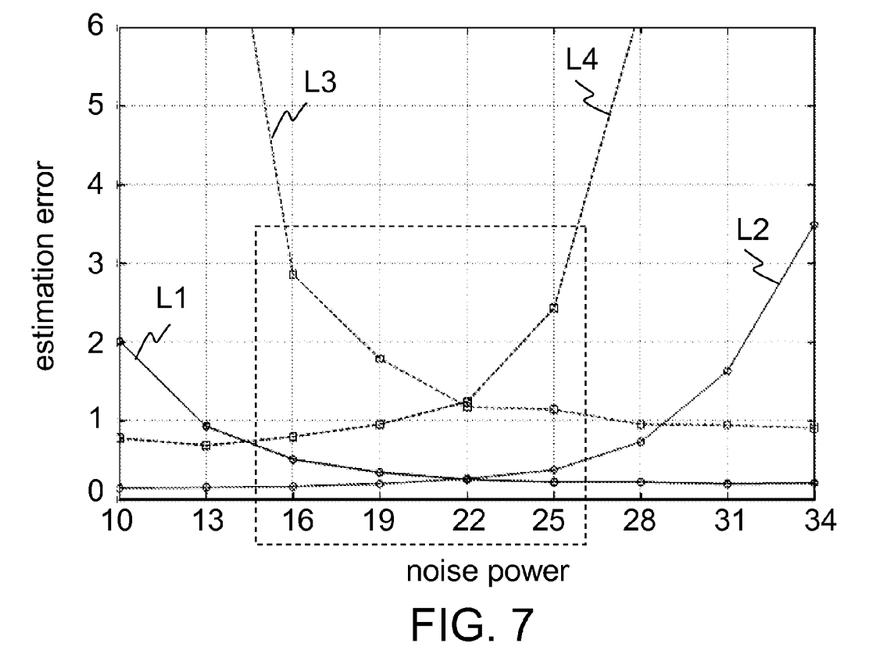
FIGS. 7 and 8 are schematic diagrams each showing an example of the estimation results according to the simulation performed on the equivalent system model in FIG. 5.
Figure 8:
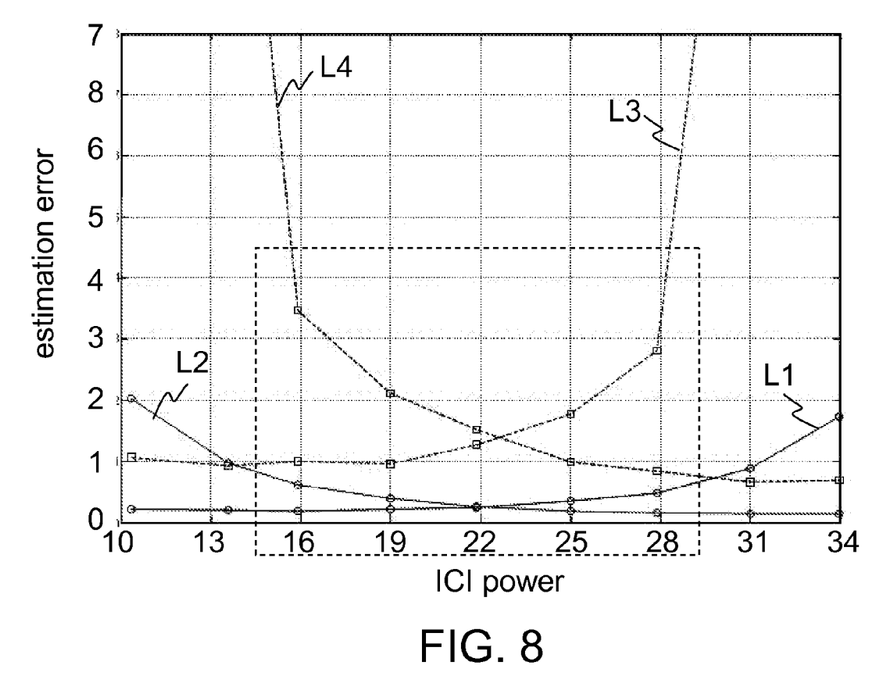

FIGS. 7 and 8 are schematic diagrams each showing an example of the estimation results according to the simulation performed on the equivalent system model 500 in FIG. 5. As shown in FIGS. 7 and 8, the vertical axis indicates the estimation error, the line segment L1 indicates the average error of the ICI power, the line segment L2 indicates the average error of the noise power, the line segment L3 indicates the maximum error of the ICI power, and the line segment L4 indicates the maximum error of the noise power.

As shown in FIG. 7, the estimation of the ICI power and the noise power on the equivalent system model 500 in FIG. 5 is simulated under a condition that the transmitter BS and the receiver MS in this example have a constant relative velocity of about 300 km/h, which corresponds to the ICI power of −22 dB. The horizontal axis indicates the noise power. The simulation result shows that when the maximum errors of the noise power and the ICI power, as indicated by the dashed lines, are less than 4 dB (i.e., the corresponding estimation errors of the line segments L3 and L4 are less than 4 dB), the corresponding noise power indicated on the horizontal axis is measurable, ranging between 15 dB and 26 dB. Besides, in the range between 10 dB and 34 dB, the average errors of the noise power and the ICI power both are less than 4 dB (i.e., the corresponding estimation errors of the line segments L1 and L2 are less than 4 dB).

As shown in FIG. 8, the estimation of the ICI power and the noise power on the equivalent system model 500 in FIG. 5 is simulated under a condition that the noise power of the equivalent system model 520 in this example has a constant value of 22 dB. The horizontal axis indicates the ICI power in this example. The simulation result shows that when the maximum errors of the noise power and the ICI power, as indicated by the dashed lines, are less than 4 dB (i.e., the corresponding estimation errors of line segments L3 and L4 are less than 4 dB) the corresponding ICI power indicated on the horizontal axis is measurable, ranging between 16 dB and 28 dB. Besides, in the range between 10 dB and 34 dB, the average error of the noise power and the ICI power both are less than 2 dB (i.e., the corresponding estimation errors of line segments L1 and L2 are less than 2 dB).

It can be seen from FIGS. 7 and 8 that the ICI power and the noise can be estimated accurately and individually according to the estimation method and the estimation device disclosed in the embodiment of the invention.

In the above-mentioned embodiments of this invention, the first to fourth pilot signals X(Pa), X(Pa+1), X(Pb), and X(Pb+1) may be all included in one symbol. However, this invention is not limited thereto. In other embodiments, the first and the second pilot signals X(Pa) and X(Pa+1) can be included in one symbol while the third and the fourth pilot signals X(Pb) and X(Pb+1) can be included in another symbol. Moreover, the smooth process mentioned above is exemplified as an interpolation process based on DFT for illustration, but this invention is not limited thereto. In practical applications, the smooth process may be an interpolation process based on DFT, an interpolation process based on least square, or an interpolation process based on minimum mean square error (MMSE). Furthermore, any smooth process that can be used in estimating the ICI power and the noise power individually is also regarded as a practicable embodiment of the invention as long as the smooth process can be used to obtain the channel response corresponding to each of two adjacent subcarriers, each of which carries a pair of pilot signals having a difference in their phase angles.

In the embodiments of the estimation method and the estimation device disclosed above according to this invention, two pilot signals which differ by a phase angle are transmitted on the two adjacent subcarriers so as to change the ICI power in the channel. Moreover, an embodiment of this invention can individually estimate the ICI power and the noise power by way of transmitting two pairs of pilot signals each having a difference in their phase angles on two adjacent subcarriers, and smoothing the estimation values to obtain the channel response corresponding to each subcarrier. Therefore, the receiver is enabled to determine whether to deal with the ICI according to the estimations of the ICI power and the noise power, thus facilitating appropriate allocation of system resources and enhancing performance of system operation.

While the invention has been described by way of example and in terms of a number of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An estimation method, for use in a receiver of an orthogonal frequency division multiplexing (OFDM) system to estimate inter-carrier interference (ICI) power and noise power in a channel, the method comprising:
   receiving a first pilot signal and a second pilot signal carried on a first subcarrier and a second subcarrier, respectively, from the channel, wherein the first subcarrier and the second subcarrier are adjacent and differ by a first phase angle; obtaining a first channel estimation value and a second channel estimation value according to the first pilot signal and the second pilot signal; and determining a first channel response by performing a smooth process on the first channel estimation value and the second channel estimation value;
   obtaining a first expected value according to the difference between the first channel expected value and the first channel response;
   receiving a third pilot signal and a fourth pilot signal carried on a third subcarrier and a fourth subcarrier, respectively, from the channel, wherein the third subcarrier and the fourth subcarrier are adjacent and differ by a second phase angle; obtaining a third channel estimation value and a fourth channel estimation value according to the third pilot signal and the fourth pilot signal; and determining a second channel response by performing the smooth process on the third channel estimation value and the fourth channel estimation value;
   obtaining a second expected value according to the difference between the third channel expected value and the second channel response; and
   individually estimating the ICI power and the noise power according to the first phase angle, the second phase angle, the first expected value, and the second expected value.

2. The method according to claim 1, wherein the first, the second, the third, and the fourth pilot signals are included in a symbol.

3. The method according to claim 1, wherein the first pilot signal and the second pilot signal are included in a symbol, while the third pilot signal and the fourth pilot signal are included in another symbol.

4. The method according to claim 1, wherein, the smooth process comprises an interpolation process with discrete Fourier transform (DFT); and
   the first expected value, the first phase angle, the ICI power, and the noise power comply with a first relation equation; the second expected value, the second phase angle, the ICI power, and the noise power comply with a second relation equation; and the first and the second relation equations are denoted by:

$$E[|\Delta H(k_p)|^2]_{\theta=\theta_1} = \frac{1}{2}P_{ICI}\left[\begin{array}{c}1-2\beta\cos(\alpha\pi-\theta_1)+\\ \beta\cos(\alpha\pi-2\theta_1)\end{array}\right] + \frac{1}{2}(P_N + P_{CCI});$$

and $$E[|\Delta H(k_p)|^2]_{\theta=\theta_2} = \frac{1}{2}P_{ICI}\left[\begin{array}{c}1-2\beta\cos(\alpha\pi-\theta_2)+\\ \beta\cos(\alpha\pi-2\theta_2)\end{array}\right] + \frac{1}{2}(P_N + P_{CCI});$$

wherein, $E[|\Delta H(k_p)|^2]_{\theta=\theta_1}$ denotes the first expected value;

$E[|\Delta H(k_p)|^2]_{\theta=\theta_2}$ denotes the second expected value;

$P_{ICI}$ denotes the ICI power;

$P_{N+PCCI}$ denotes the noise power;

$\theta_1$ denotes the first phase angle;

$\theta_2$ denotes the second phase angle;

$\alpha$ denotes the ratio between the channel length and the size of DFT; and $\beta$ equals to $3/\pi^2$.

5. The method according to claim 4, wherein if the first phase angle equals substantially to $\pi$, the second phase angle equals substantially to zero, the ICI power and the noise power can be obtained by:

$$P_{ICI} = \frac{E[|\Delta H(k_p)|^2]_{\theta=\pi} - E[|\Delta H(k_p)|^2]_{\theta=0}}{2\beta\cos(\alpha\pi)},$$

and $$P_N + P_{ICI} \approx E[|\Delta H(k_p)|^2]_{\theta=\pi} + E[|\Delta H(k_p)|^2]_{\theta=0} - P_{ICI}[1+\beta\cos(\alpha\pi)];$$

wherein, $E[|\Delta H(k_p)|^2]_{\theta=\pi}$ denotes the first expected value when the first phase angle equals substantially to $\pi$; and $E[|\Delta H(k_p)|^2]_{\theta=}$ denotes the second expected value when the second phase angle equals substantially to zero.

6. The method according to claim 1, wherein the difference between subcarrier indexes of the first subcarrier and the second subcarrier equals to 1, while the difference between subcarrier indexes of the third subcarrier and the fourth subcarrier equals to 1.

7. The method according to claim 1, wherein the smooth process comprises an interpolation process based on DFT, an interpolation process based on least square, or an interpolation process based on minimum mean square error (MMSE).

8. An estimation device, for use in an orthogonal frequency division multiplexing (OFDM) system to estimate an intercarrier interference (ICI) power and a noise power in a channel, the estimation device comprising:

a demodulation unit, for receiving a first pilot signal and a second pilot signal carried on a first subcarrier and a second subcarrier, respectively, from the channel, and for receiving a third pilot signal and a fourth pilot signal carried on a third subcarrier and a fourth subcarrier, respectively, from the channel, wherein the first subcarrier and the second subcarrier are adjacent and differ by a first phase angle, and the third subcarrier and the fourth subcarrier are adjacent and differ by a second phase angle;

a channel estimation unit, for obtaining a first channel estimation value and a second channel estimation value according to the first pilot signal and the second pilot signal, respectively, and for obtaining a third channel estimation value and a fourth channel estimation value according to the third pilot signal and the fourth pilot signal, respectively;

a smooth process unit, for determining a first channel response by smoothing the first channel estimation value and the second channel estimation value, and for determining a second channel response by smoothing the third channel estimation value and the fourth channel estimation value;

a calculation unit, for obtaining a first expected value according to the difference between the first channel expected value and the first channel response, and for obtaining a second expected value according to the difference between the third channel expected value and the second channel response; and a power estimation unit for individually estimating the ICI power and the noise power according to the first phase angle, the second phase angle, the first expected value, and the second expected value.

9. The device according to claim 8, wherein the first, the second, the third, and the fourth pilot signals are included in a symbol.

10. The device according to claim 8, wherein the first pilot signal and the second pilot signal are included in a symbol, and the third pilot signal and the fourth pilot signal are included in another symbol.

11. The device according to claim 8, wherein, the smooth process unit smoothes the estimation value by using an interpolation process with discrete Fourier transform (DFT); and the first expected value, the first phase angle, the ICI power, and the noise power comply with a first relation equation, the second expected value, the second phase angle, the ICI power, and the noise power comply with a second relation equation, and the first and the second relation equations are denoted by:

$$E[|\Delta H(k_p)|^2]_{\theta=\theta_1} = \frac{1}{2}P_{ICI}\begin{bmatrix} 1-2\beta\cos(\alpha\pi-\theta_1)+\\ \beta\cos(\alpha\pi-2\theta_1) \end{bmatrix} + \frac{1}{2}(P_N+P_{CCI});$$

and $$E[|\Delta H(k_p)|^2]_{\theta=\theta_2} = \frac{1}{2}P_{ICI}\begin{bmatrix} 1-2\beta\cos(\alpha\pi-\theta_2)+\\ \beta\cos(\alpha\pi-2\theta_2) \end{bmatrix} + \frac{1}{2}(P_N+P_{CCI});$$

wherein, $E[|\Delta H(k_p)|^2]_{\theta=\theta_1}$ denotes the first expected value;

$E[|\Delta H(k_p)|^2]_{\theta=\theta_2}$ denotes the second expected value;

$P_{ICI}$ denotes the ICI power;

$P_N + P_{CCI}$ denotes the noise power;

$\theta_1$ denotes the first phase angle;

$\theta_2$ denotes the second phase angle;

$\alpha$ denotes the ratio between the channel length and the size of DFT; and $\beta$ equals to $3/\pi^2$.

12. The device according to claim 11, wherein if the first phase angle equals substantially to $\pi$, the second phase angle equals substantially to zero, the ICI power and the noise power are indicated by:

$$P_{ICI} = \frac{E[|\Delta H(k_p)|^2]_{\theta=\pi} - E[|\Delta H(k_p)|^2]_{\theta=0}}{2\beta\cos(\alpha\pi)},$$

and $$P_N + P_{ICI} \approx E[|\Delta H(k_p)|^2]_{\theta=\pi} + E[|\Delta H(k_p)|^2]_{\theta=0} - P_{ICI}[1+\beta\cos(\alpha\pi)];$$

wherein $E[|\Delta H(k_p)|^2]_{\theta=\pi}$ denotes the first expected value when the first phase angle equals substantially to $\pi$; and $E[|\Delta H(k_p)|^2]_{\theta=0}$ denotes the second expected value when the second phase angle equals substantially to zero.

13. The device according to claim 8, wherein the difference between subcarrier indexes of the first subcarrier and the second subcarrier equals to 1, and the difference between subcarrier indexes of the third subcarrier and the fourth subcarrier equals to 1.

14. The device according to claim 8, wherein the smooth process unit smoothes the estimation values by using an interpolation process based on DFT, an interpolation process based on least square, or an interpolation process based on minimum mean square error (MMSE).

* * * * *